Patented July 29, 1947

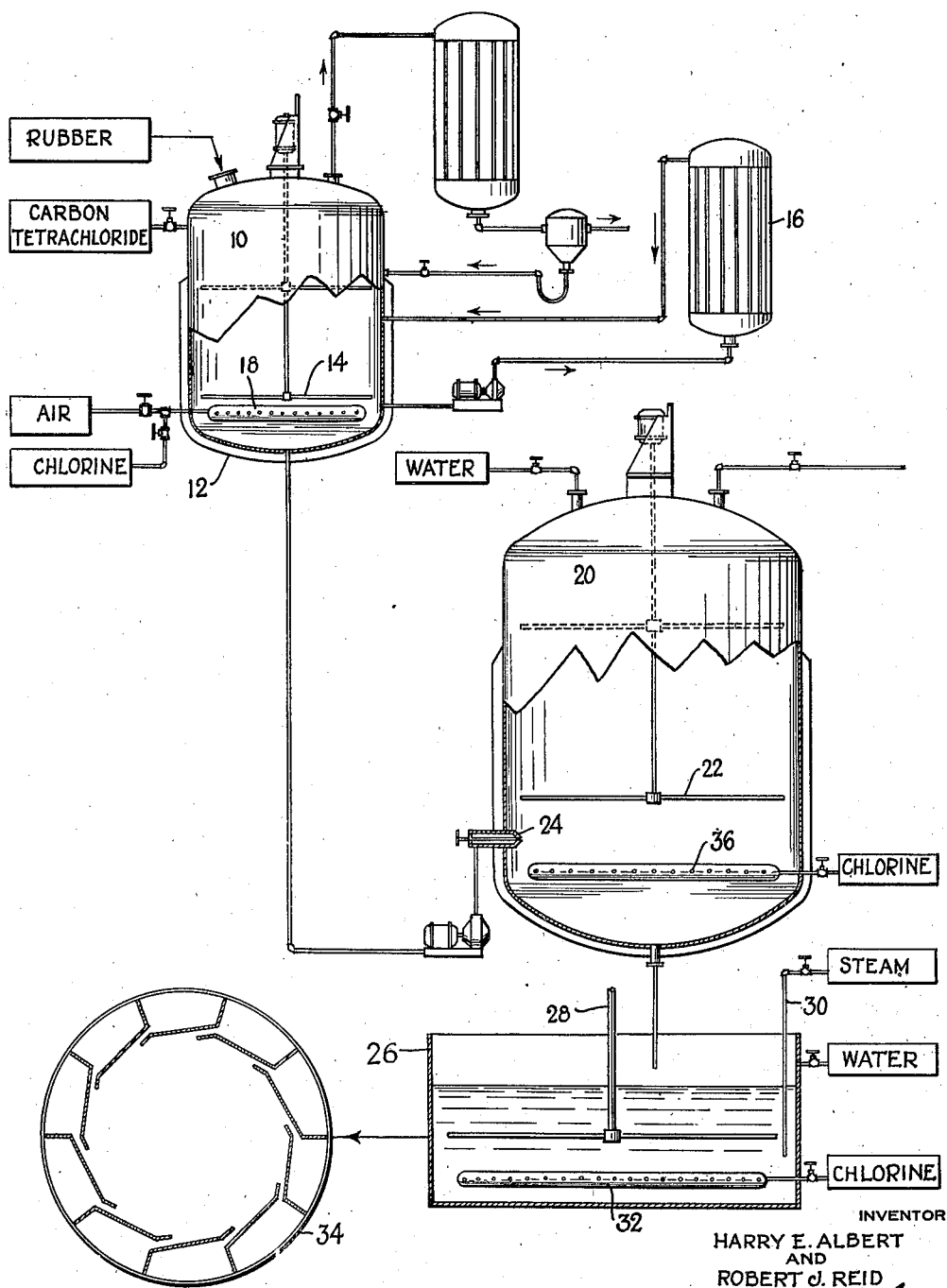

2,424,920

UNITED STATES PATENT OFFICE 2,424,920

BENEFICIATION OF CHLORINE-CONTAINING RUBBER DERIVATIVES

Harry E. Albert, Akron, Ohio, and Robert J. Reid, Fair Lawn, N. J., assignors to The Firestone Tire and Rubber Company, Akron, Ohio, a corporation of Ohio Application May 25, 1944, Serial No. 537,374

3 Claims. (Cl. 260—772)

This invention relates to the production of stable and otherwise improved chlorine-containing natural rubber derivatives, such as chlorinated rubber, hydrochlorinated rubber and chlorinated-hydrochlorinated rubber.

Natural rubber contains certain proteinaceous, carbohydrate, fatty and resinous impurities. When rubber is converted into its chlorine-containing derivatives, these impurities or their derivatives are carried over into the products and detract from the stability, clarity and other desirable properties thereof. Accordingly, chlorine-containing rubber derivatives are ordinarily made from rubbers which have been specially purified or "deprotenized," which purification constitutes a cumbersome and expensive step in the manufacturing process, especially since it must usually be carried out upon the original latex.

Accordingly, it is an object of this invention to provide a process for the manufacture of chlorine-containing rubber derivatives in which the purification of the rubber may be omitted.

A further object is to improve the clarity and color of chlorine-containing rubber derivatives.

A further object is to provide a process for improving the properties of such rubber derivatives by the use of reagents which are cheap and which may readily be removed from the final products.

A still further object is to provide such a process which may be carried out expeditiously and by the use of techniques which are familiar to chemical operatives.

A still further object is to provide a process for the beneficiation of chlorine-containing rubber derivatives which may be carried out in relatively inexpensive equipment.

The above and further objects will be manifest in the description of the invention which follows, when considered in connection with the accompanying drawing, which consists of a single diagrammatic figure, partly in section and somewhat schematic, illustrating the process of the invention.

It has now been discovered that treatment of chlorine-containing rubber derivatives with chlorine in the presence of water will render innocuous and/or water-soluble the non-rubber impurities in chlorine-containing rubber derivatives prepared from ordinary commercial rubber. The treated rubber derivative is washed, either concurrently with the chlorine-and-water treatment or subsequently thereto, to remove the solubilized impurities, and the resultant product will be found to have a high degree of stability, clarity and other desirable properties. Likewise, irrespective of the presence or absence of impurities, the essential properties of the rubber derivative itself may be improved by this process; for instance the process may be incidentally so carried out as to reduce the viscosity of the chlorine-containing rubber derivative, if this is desired.

The chlorine-containing rubber derivatives which may be beneficiated by the practice of this invention may be roughly divided into three types which merge imperceptibly into one another, viz., the chlorinated rubbers, the rubber hydrochlorides and the chlorinated rubber hydrochlorides. The chlorinated rubbers are exemplified in the well known commercial products such as "Parlon" and "Duron" (trade names respectively of the Hercules Powder Company and The Firestone Tire and Rubber Company) and are manufactured by introducing chlorine into solutions of natural rubber. The chlorine adds on at the double bonds, and to some extent replaces hydrogen, in the rubber molecule. Usually sufficient chlorine is used (approximately 66%, based on the weight of the rubber) to completely saturate the rubber; however, one of the applicants (Reid) is a co-discoverer of fact that suitable and stable products can be made by the introduction of approximately 56% chlorine, and it is accordingly to be understood that such stable incompletely chlorinated rubbers are likewise suitable materials for the practice of this invention. Rubber hydrochlorides are made by introducing hydrogen chloride into solutions of natural rubber, the hydrogen chloride adding on at the double bonds in the rubber molecule, the products conventionally containing about 31% of chlorine see the patent to Kutz 2,331,327, page 1, column 1, line 29; such materials are exemplified in the product known as "Pliofilm" (trade name of The Goodyear Tire and Rubber Company). Chlorine-containing rubber derivatives intermediate between the chlorinated rubbers and rubber hydrochlorides can be prepared by initially hydrochlorinating rubbers up to a certain point and thereafter completing the saturation of the rubber by chlorination, such processes being disclosed in the patent to Kutz No. 2,331,327 and resulting in products containing from about 42% to about 52% of chlorine. These various rubber resins vary in properties, depending upon their exact composition and history; however, it has been found that all of these chlorine containing rubbers may be beneficiated by the process of this invention. Likewise similar products made by chlorination and/or hydrochlorination of synthetic rubbers may likewise be improved by the practice of this invention.

Most conveniently, the chlorine-and-water treatment is carried out upon the granular, porous forms of rubber derivatives obtained by precipitation from solution. For instance, rubber derivatives are usually prepared by the action of chlorine and/or hydrogen chloride upon solvent solutions of rubber. The resulting solution may then be injected as a fine stream into hot water, whereupon the solvent is flashed off, leaving the rubber derivative in a finely granular, porous state providing excellent surface contact with the reactants employed in this invention. However the chlorine-and-water treatment may be carried out upon chlorine-containing rubber derivatives in any other forms presenting a sufficiently large contact area, for instance upon solutions of the derivatives, or upon pulverized derivatives, or upon thin sheets of the derivatives.

The selected form of the rubber derivative is preferably suspended and agitated in water, and chlorine is injected into the suspension. The temperature of the mass is maintained from about 20° C. up to the boiling point of the materials under the conditions of the reaction, the higher temperatures naturally accelerating the purification reactions. In some cases the reaction may be carried out at temperatures substantially in excess of 100° C. if the reactants are confined under pressure. In general, preferred temperatures will lie in the range 70°–95° C. Likewise the temperature may be varied during the treatment, and in the preferred cases involving porous forms of the rubber derivatives, the practice results in improved contact of the chlorine and water with the rubber derivative. Thus, the reaction mass may be initially heated to a relatively high temperature: the gases entrapped in the pores of the derivative expand and to some extent are expelled, as evidenced by a tendency of the rubber derivative to float to the top. The temperature is then lowered, whereupon the remaining entrapped gases contract and the porous derivative imbibes, and is thoroughly contacted by, the chlorine and water. This may be repeated from time to time during the processing as found expedient.

The chlorine should preferably be introduced into the reaction mass at such a rate as to maintain the aqueous phase substantially saturated with chlorine, saturated conditions, of course being determined by the partial pressure of the chlorine in contact with the mass, this partial pressure being in turn the difference between the total pressure on the system and the vapor pressure of the water and other volatile substances present. In order to maintain a suitable concentration of chlorine, therefore, the temperature of the reaction mass should be held somewhat below the boiling point thereof under the pressure at which the treatment is carried out, to avoid boiling away the chlorine as fast as it is introduced. The chlorine may of course be present in concentration less than the saturation value thereof, but in such case the reaction will proceed more slowly. The mode of introduction of the chlorine may vary; preferably the chlorine is introduced by jets under the surface of the reaction mass, but alternatively, the mass may be subjected to strong agitation in a chlorine-containing atmosphere. Likewise a substantial proportion of all of the chlorine may have been dissolved in the water before the entry of the rubber derivative, or may be introduced by entrainment with the rubber derivative; for instance the original reaction mass in which a chlorinated rubber was produced may be agitated with water, in which case a considerable amount of chlorine will be carried over from the chlorination step. As a rule, the chlorine introduced in this manner will be insufficient in quantity to effect the necessary purification of the rubber derivative, and further quantities of chlorine must be supplied by injection, etc.

One modification (Example IV hereinafter) in which chlorine is carried over from the chlorination step involves the direct precipitation and granulation of a free-chlorine-containing rubber chloride solution with hot water. The chlorine introduced in this manner has especially good contact with the rubber chloride. Additional chlorine may simultaneously be supplied. This simultaneous precipitation and treatment with chlorine and water constitutes a very important subsidiary feature of this invention.

The time during which the chlorine-containing rubber derivative is subjected to the chlorine-and-water treatment of this invention will vary in accordance with the exact nature and history of the rubber derivative and in accordance with the properties desired in the final product. To secure a given degree of purification in the final product, less time will be required with elevated temperatures and with increased concentrations of the chlorine in the reaction mixtures. As noted above, temperature and effective chlorine concentration are inverse functions at any given total pressure, so that if the temperature is raised, the total pressure on the reaction mass must be increased in order to maintain constant, or increase, the chlorine concentration. By way of specific example, a chlorinated rubber derived from a commercial pale crepe rubber can be purified to a very satisfactory degree by treatment with water at 90° C. and with introduction of chlorine at such a rate as to maintain substantial saturation of the water, for approximately 8 hours. The adjustment of the time necessary to accommodate products of less purity and the use of other temperatures and concentrations of chlorine will be obvious in view of the foregoing discussion.

The chlorine-and-water treatment renders water-soluble and/or innocuous the greater portion of the proteinaceous and other impurities in the chlorine-containing rubber derivative, and a large portion of the solubilized material is washed away by the water during the chlorine-and-water treatment. Supplemental to the washing that inherently occurs during the chlorine-and-water treatment, it may often be advantageous to further wash the product with fresh quantities of water in a subsequent separate step, so as to remove any remaining soluble impurities. This additional washing also removes any excess chlorine or hydrochloric acid. Further, the additional washing makes possible the carrying out of the chlorine-and-water treatment under accelerated conditions, without regard for incidental washing out of impurities (Example IV, hereinafter). Thus, the chlorinated rubber may be given a very brief, intensive treatment with chlorine and water at elevated temperatures up to 200° C. and at corresponding pressures. The impurities are thereby solubilized and/or rendered innocuous, but, on account of the brevity of the treatment, no substantial leaching out of the impurities is accomplished. Instead, the impurities are leached out in a subsequent washing step, thus providing a more efficient distribution of functions amongst equipment designed for the specific purposes of rapid chlorination and of washing.

A variation in the process of this invention consists in treatment of chlorine-containing rubber derivatives with chlorine and steam in the absence of any substantial amounts of liquid aqueous phase. Substantially the same solubilization and/or alteration of the non-rubber impurities occurs in this case as occurs in the processes in which a substantial amount of liquid aqueous phase is present. The solubilized impurities are removed from the rubber derivative by subsequent washing with water.

A further possible variation in the process of this invention resides in continuous carrying out thereof. Thus the precipitated rubber derivative might be run countercurrent to water through a conventional "Dorr" thickener-washer train. Chlorine would be introduced in the middle and initial sections of the train to effect the desired chlorination, the terminal portions of the train being employed to wash the product and to salvage excess chlorine.

The invention has been described largely in connection with the removal, or rendering innocuous, of impurities in chlorine-containing rubber derivatives, and it is anticipated that the invention will be of chief use in this connection. Nevertheless, the practice of this invention effects a substantial reduction in viscosity of any chlorine-containing rubber derivative, and also effects marked improvement in the solubility, clarity and other properties thereof, regardless of the presence or absence of impurities therein. Such reduction of viscosity and improvement in general properties are often very advantageous, especially when the viscosity of the derivative is higher than is desired in the ultimate use for which the derivative is intended. Accordingly, the ambit of this invention extends to the treatment of chlorine-containing derivatives made from pure, as well as from impure, rubbers.

The improved products obtained by the practice of this invention are characterized by a high degree of stability, good color, clarity in solution, water resistance and other excellent properties. The process of this invention may be carried out in simple apparatus of relatively inexpensive construction materials, and requires only a relatively short processing time.

With the foregoing discussion in mind, there are given herewith detailed examples of the practice of this invention. All parts given are by weight.

EXAMPLE I

| | Parts |
|---|---|
| Chlorinated rubber (containing 66% chlorine, finely granulated) | 100 |
| Water | 1000 |
| Chlorine | as required |

A series of treatments were carried out upon the chlorinated rubber at different temperatures and for varying lengths of time. In each treatment, the chlorinated rubber and water in the above recipe were mixed and agitated, the temperature adjusted and maintained at the point selected for that treatment, and chlorine passed into the suspension at such a rate as to keep the water saturated with chlorine. At the end of time selected for the treatment, the treated rubber chloride was filtered off from the suspension, washed with water, and the properties thereof were determined as follows:

Tests

Light Transmission.—The rubber chloride was made up into a 20% solution in toluene, and the transmission of light therethrough, expressed as the percentage of light-transmission of a pure toluene blank, was determined on a Lumetron photometer using a blue filter No. B420.

Viscosity was determined as centipoises of a 20% toluene solution at 25° C.

Clarity.—A 20% toluene solution was visually inspected and the qualitative appearance thereof recorded.

Odor.—Qualitative sensory impression of the operator was recorded.

The results of the tests on each specimen of treated rubber chloride are tabulated herewith, under the headings of time and temperature at which the chlorine-and-water treatment was carried out on that specimen.

Table I

| Time of Treatment, hours | Properties of Rubber Chloride Treated At— | | | | | |
|---|---|---|---|---|---|---|
| | 70° C. | | 90° C. | | 100° C. | |
| | % Light Transmission / Viscosity | Clarity / Odor | % Light Transmission / Viscosity | Clarity / Odor | % Light Transmission / Viscosity | Clarity / Odor |
| Untreated | 11.3 / 126 | poor / strong | 11.3 / 126 | poor / strong | 11.3 / 126 | poor / strong |
| 4 | -- / -- | fair / slight | 53 / 78 | good / slight | -- / -- | good / none |
| 8 | 52 / 86 | fair / none | 57 / 71 | good / none | 52 / 96 | good / none |
| 12 | 57 / 77 | good / none | 59 / 61 | good / none | -- / -- | -- / -- |
| 24 | -- / -- | -- / -- | 56.8 / 43 | fair / none | -- / -- | -- / -- |
| 36 | -- / -- | -- / -- | 55 / 31 | fair / none | -- / -- | -- / -- |

From the table it will be apparent that a very great improvement is wrought in the properties of the rubber chloride by the treatment of this invention. It will be noted that treatments carried out at 90° C. resulted in more rapid improvement of the properties of the rubber chloride than treatments carried out at higher and lower temperatures. This optimum of 90° C. illustrates the conflicting effects of acceleration of the reaction at higher temperatures and decrease in solubility of the chlorine at higher temperatures. The speed of the reaction at 100° C. can, of course, be accelerated by increasing the total pressure on the system so as to provide greater solubility of the chlorine.

EXAMPLE II

Chlorine-steam treatment

Finely-divided chlorinated rubber was loosely packed into a 1″ glass tube sloping at an angle of 45° from the vertical so as to avoid unduly solid packing of the material. Chlorine and steam in equal quantities were passed in at the top of the tube and removed at the bottom. Samples of the material were removed at the end of four hours and at the end of eight hours, washed with water, and the properties determined as described in Example I. The results are tabulated herewith:

Table II

| Time of Treatment, hours | Properties of The Treated Material | | | |
|---|---|---|---|---|
| | Light Transmission, Per cent | Viscosity (Cps. at 25°) | Clarity | Odor |
| 0 | 11.3 | 126 | very poor | strong. |
| 4 | 56 | 89 | fair | none. |
| 8 | 54 | 74 | do | Do. |

EXAMPLE III

The procedure of this invention was carried out in the apparatus shown in the drawing.

A. *Preparation of chlorinated rubber*

Pale crepe rubber (grade DD) _____lbs__ 90
Carbon tetrachloride_____gals__ 225
Chlorine_____lbs__ 253

A 300-gallon glass-lined, closable kettle 10 having a heating jacket 12, an agitator 14, and a forced-circulation external cooling heat-exchange device 16 was provided for this step. The kettle was also provided with a diffusing pipe 18 for the introduction of gases at the bottom thereof. The rubber was milled until the plasticity thereof was reduced to less than 10 seconds (T4¼ value) as determined on a Firestone extrusion plastometer. The carbon tetrachloride and rubber were introduced into the kettle 10 and agitated together for 2 hours. Thereafter steam was turned into the jacket 12 to raise the temperature of the batch to 160° F. over the course of 1 hour. Agitation was continued for a further two hours and the resultant cement then cooled to 85° F. by circulation through the cooler 16.

Chlorine was introduced into the cement through the diffuser 18 at the rate of 150 lbs. per hour, until the temperature rose to 125° F., after which the rate of introduction was cut back to a rate (about 100 lbs. per hour) such that the temperature remained below 130° F. At the end of about two hours, the batch reached an "invert" stage at which separation of solid material from the batch was observed. Thereupon, the kettle was closed up to confine the contents under pressure, and the chlorine flow adjusted to 70 lbs. per hour. The temperature of the mass progressively decreased and when the temperature fell to 100° F., the chlorine rate was stepped up to 250 lbs. per hour. When all of the chlorine of the recipe had been added, steam was turned into the jacket 12, and shut off again when the temperature of the mass reached 140° F. The heat of the reaction carried the temperature up to 190° F. Pressure was then released from the kettle, and air blown through the diffuser 18 at the rate of 15 lbs. per hour to sweep out the excess chlorine, the temperature of the batch being held in the range 165°-170° F. throughout the blowing.

B. *Precipitation*

A closed, glass-lined jacketed 1000-gallon kettle 20 provided with an agitator 22 and with an injection nozzle 24 at the bottom was employed in this step. Six hundred gallons of water were introduced into the kettle, and heated to 180° F., and the agitator 22 was started. The rubber chloride cement prepared as described at "A" was then injected through the nozzle 24 into the bottom of the kettle. The carbon tetrachloride was flashed off, leaving the chlorinated rubber in granular, porous form.

C. *Chlorine-and-water treatment*

Chlorinated rubber (prepared as in A and
 B) _____lbs__ 114
Water_____gallons__ 300
Chlorine _____as required A 350 gallon wooden tank 26 having an agitator 28, a steam heating injector 30, and a diffusing pipe 32 for gases was provided for this step. The water and chlorinated rubber were introduced into the tank and agitation commenced and continued throughout all subsequent processing. The introduction of chlorine through the diffuser 32 was commenced and continued throughout to the point where it is hereinafter stated to be turned off. The steam-heating injector 30 was turned on, and when the temperature of the batch had risen so as to cause the chlorinated rubber to float (due to expansion of the gases in the pores thereof) steam heating was discontinued and cold water added to reduce the temperature to 185° F., at which point the chlorinated rubber sank from the surface and formed a continuous slurry. The temperature was held in the range 170°-185° F. for 1½ hours. Thereafter the mass was again steam-heated to float the chlorinated rubber, and the temperature kept at this level for 1 hour. Cold water was again added to reduce the temperature to 170°-185° F. and to cause the chlorinated rubber to revert to a continuous slurry. After a total elapsed time of 6½ hours from the beginning of the chlorine-and-water treatment, the chlorine was turned off, and the chlorine water drained away from the chlorinated rubber. The chlorinated rubber was then twice agitated and washed with 200-gallon portions of cold water, each wash occupying 15 minutes and the water being drained off after each wash. The product was then dried in a glass-lined rotary louver drier 34 with the air at 280° F. and with the shell at 170° F. The dried product was stable, had excellent clarity in solution, and was free of objectionable odor. A 20% toluene solution had a light transmission of 56% and a viscosity of 70 centipoises, determined as described in Example I.

EXAMPLE IV

A. *Preparation of chlorinated rubber*

The portion of this procedure described under "A" in Example III was precisely repeated, with the exception that the final air-blowing to remove chlorine was omitted.

B. *Precipitation and high pressure chlorine-and-water treatment*

The kettle 20 was employed in this step. Six hundred gallons of water were run into the kettle, heated to 180° F., and saturated with chlorine introduced through the diffuser 36. Agitation was commenced and the rubber chloride cement (300 gallons) prepared as described at "A" was then injected through the nozzle 24, to granulate the rubber chloride. During injection, chlorine was continuously introduced. When all the chlorinated rubber was precipitated, the kettle was closed up, and chlorine was introduced through a diffuser 36 and steam turned into the jacket, these variables being adjusted to obtain a temperature of 250° F. and a gauge pressure of 16 pounds per square inch in the batch. These conditions were maintained for ½ hour, after which heating and chlorine addition were discontinued, excess steam and chlorine blown off, and the charge dropped into the tank 26. The batch was twice washed with 200-gallon portions of water and dried in the drier 34 as in Example III. The 20% toluene solution of the product had a light transmission of 53% and a viscosity of 63 centipoises.

Procedures similar to those just described were applied to rubber hydrochloride and to chlorinated rubber hydrochloride made from ordinary unpurified commercial crepe rubbers, and resulted in marked improvement in the properties of these materials.

From the foregoing general description and detailed examples, it is evident that the practice of this invention greatly improves the properties of chlorine-containing rubber derivatives made from ordinary commercial rubbers. The process may be carried out expeditiously and by the use of familiar and ordinary techniques. The materials of construction required in the apparatus are cheap, wooden vessels, for instance, being entirely satisfactory; and the reactants (chlorine and water) are cheaply and reliably procurable. The chlorine, being gaseous and water-soluble, presents no problem of removal from the final product.

What is claimed is:

1. Process which comprises injecting chlorine, for from 4 to 36 hours, into an aqueous suspension of a granular porous solution-chlorinated rubber obtained by chlorinating a solution of rubber in an organic solvent and containing from about 56% to about 66% of chlorine, the temperature of the suspension being maintained between 70° C. and 95° C. during the greater part of said injection, and said granular porous chlorinated rubber having been produced by injetcion of volatile solvent solution of chlorinated rubber into a heated medium.

2. Process which comprises injecting chlorine, for from 4 to 36 hours, into an aqueous suspension of a granular, porous solution-chlorinated rubber obtained by chlorinating a solution of rubber in an organic solvent and containing from about 56% to about 66% of chlorine, the temperature of the suspension being maintained between 70° C. and 95° C. during the greater part of said injection and said granular chlorinated rubber being highly porous and having been produced by injection of volatile solvent solution of chlorinated rubber into a heated medium, the temperature being elevated and depressed at least once during the process.

3. Process which comprises injecting chlorine for from 4 to 36 hours into an aqueous suspension of a granular rubber derivative selected from the group consisting of (1) rubber derivatives obtained by chlorinating solutions of rubber in an organic solvent and containing from about 56% to about 66% of chlorine (2) rubber derivatives obtained by hydrochlorinating solutions of rubber in organic solvents and containing about 31% of chlorine and (3) rubber derivatives obtained by successive hydrochlorination and chlorination of solutions of rubber in organic solvents and containing from about 42% to about 52% of chlorine, the temperature of the suspension being maintained between 73° C. and 95° C. during said injection and said injection being continued until a substantial increase in the light-transmission of a toluene solution results in the product.

HARRY E. ALBERT.
ROBERT J. REID.

REFERENCES CITED

The following references are of record in the file of this patent:

UNITED STATES PATENTS

| Number | Name | Date |
|---|---|---|
| Re. 9,777 | Lamb | June 21, 1881 |
| 1,495,580 | Edison | May 27, 1924 |
| 2,094,408 | Orthner | Sept. 28, 1937 |
| 2,198,973 | Peterson | Apr. 30, 1940 |
| 2,208,442 | Winbelmann | July 16, 1940 |
| 2,021,318 | McGavack | Nov. 19, 1935 |
| 2,376,027 | Bouchard | May 15, 1945 |

FOREIGN PATENTS

| Number | Country | Date |
|---|---|---|
| 415,195 | Great Britain | Aug. 23, 1934 |

Certificate of Correction

Patent No. 2,424,920. July 29, 1947.

HARRY E. ALBERT ET AL.

It is hereby certified that error appears in the printed specification of the above numbered patent requiring correction as follows: Column 4, line 9, for "proportion of" read *proportion or*; and that the said Letters Patent should be read with this correction therein that the same may conform to the record of the case in the Patent Office.

Signed and sealed this 30th day of December, A. D. 1947.

[SEAL]

THOMAS F. MURPHY,
*Assistant Commissioner of Patents.*